Inventors:
OSIAS FELDMAN, NICOLAE BÎRLEA,
STELIAN PÎRVULESCU, LEIBA CARUCERU,
HEINRICH WEINBERG          by
          ARTHUR O. KLEIN their ATTORNEY Aug. 22, 1967 O. FELDMAN ETAL 3,336,955
AUTOMATIC UNIT FOR PACKING OF CARBIDE PELLETS IN DRUMS
Filed March 4, 1964 9 Sheets-Sheet 3

Inventors:
OSIAS FELDMAN, NICOLAE BÎRLEA,
STELIAN PÎRVULESCU, LEIBA CARUCERU and
HEINRICH WEINBERG by
ARTHUR O. KLEIN their ATTORNEY Aug. 22, 1967  O. FELDMAN ETAL  3,336,955
AUTOMATIC UNIT FOR PACKING OF CARBIDE PELLETS IN DRUMS
Filed March 4, 1964  9 Sheets-Sheet 6

Inventors:
OSIAS FELDMAN, NICOLAE BÎRLEA,
STELIAN PÎRVULESCU, LEIBA CARUCERU and
HEINRICH WEINBERG  by
ARTHUR O. KLEIN their ATTORNEY Aug. 22, 1967  O. FELDMAN ETAL  3,336,955
AUTOMATIC UNIT FOR PACKING OF CARBIDE PELLETS IN DRUMS
Filed March 4, 1964  9 Sheets-Sheet 7

Inventors:
OSIAS FELDMAN, NICOLAE BÎRLEA,
STELIAN PÎRVULESCU, LEIBA CARUCERU and
HEINRICH WEINBERG  by
    ARTHUR O. KLEIN their ATTORNE Aug. 22, 1967  O. FELDMAN ETAL  3,336,955
AUTOMATIC UNIT FOR PACKING OF CARBIDE PELLETS IN DRUMS
Filed March 4, 1964  9 Sheets-Sheet 8

Inventors:
OSIAS FELDMAN, NICOLAE BÎRLEA,
STELIAN PÎRVULESCU, LEIBA CARUCERU and
HEINRICH WEINBERG  by
ARTHUR O. KLEIN, their ATTORNEY Aug. 22, 1967    O. FELDMAN ETAL    3,336,955
AUTOMATIC UNIT FOR PACKING OF CARBIDE PELLETS IN DRUMS
Filed March 4, 1964    9 Sheets-Sheet 9

Inventors:
OSIAS FELDMAN, NICOLAE BÎRLEA,
STELIAN PÎRVULESCU, LEIBA CARUCERU and
HEINRICH WEINBERG    by
ARTHUR O. KLEIN, their ATTORNEY

United States Patent Office 3,336,955
Patented Aug. 22, 1967

3,336,955
AUTOMATIC UNIT FOR PACKING OF CARBIDE PELLETS IN DRUMS
Osias Feldman, Nicolae Birlea, Stelian Pirvulescu, Leiba Caruceru, and Heinrich Weinberg, Bucharest, Rumania, assignors to Ministerul Industriei Chimice, Bucharest, Rumania, a firm
Filed Mar. 4, 1964, Ser. No. 349,449
4 Claims. (Cl. 141—72)

This invention refers to an automatic apparatus for packing carbide pellets in sizes from 4 to 80 mm. or of any other similar materials into metallic drums. The unit comprises a series of devices which take the empty drums from a conveyor provided with driven rollers, fill the empty drums and then put them back on the same conveyor from whence they are transported to a storage area.

The packing of carbide pellets has until now been performed by drum filling means which are very time consuming to operate; the handling of the drums, separating of the quantity of pellets, levelling of the naturally sloping cone of pellets for filling up the empty spaces in the drums, the freeing of the lid seat, require a hard manual labor, for instance an operation with a crowbar, in conditions of dust and noise.

The present invention avoids the above mentioned drawbacks of the existing known installations, because all of the handling of the drums and their filling operation with the desired quantity of pellets, with minor exceptions, are performed automatically in a continuous working cycle, with complete absence of human labor.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
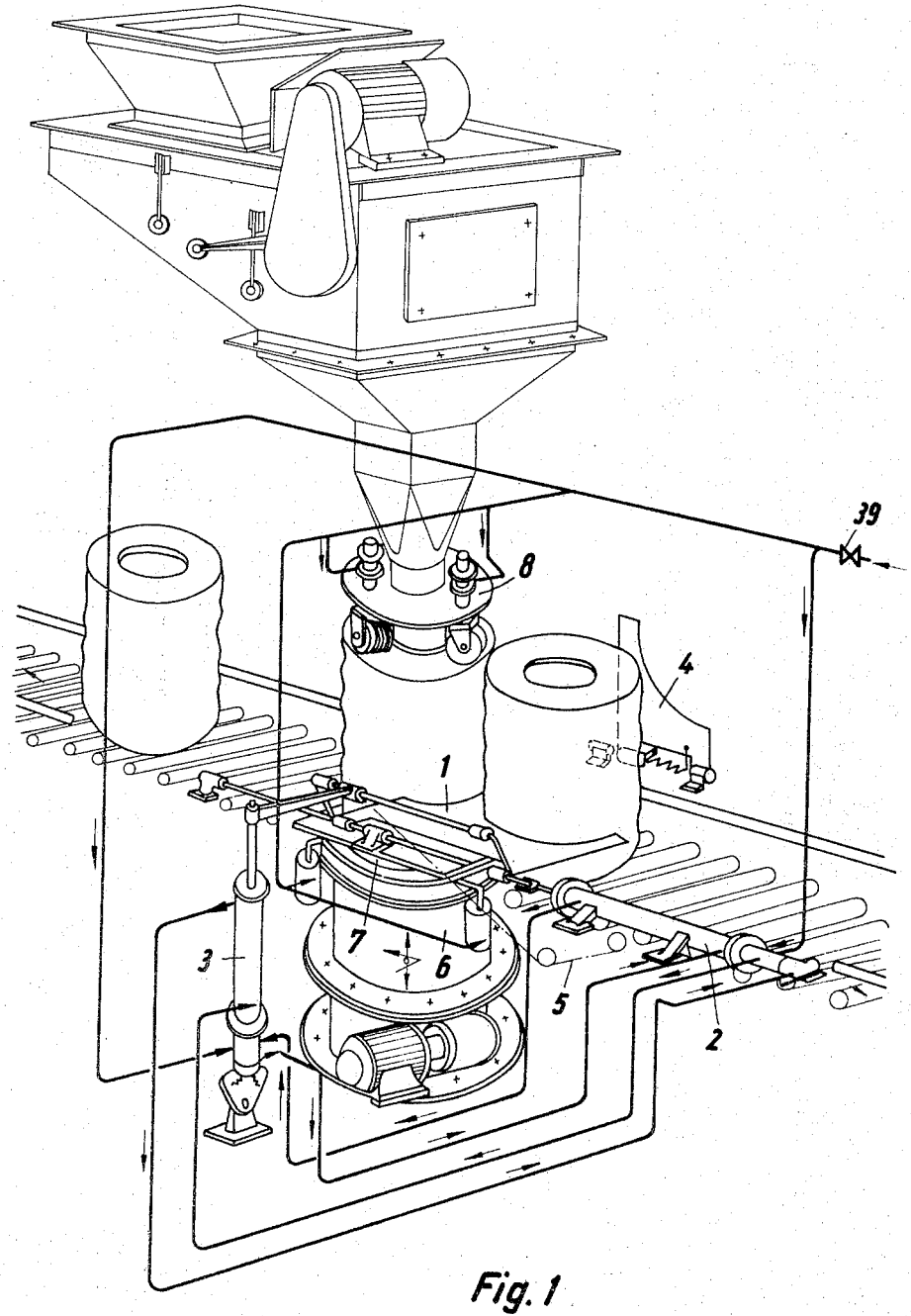
FIG. 1 illustrates in perspective the apparatus of this invention.
Figure 2:
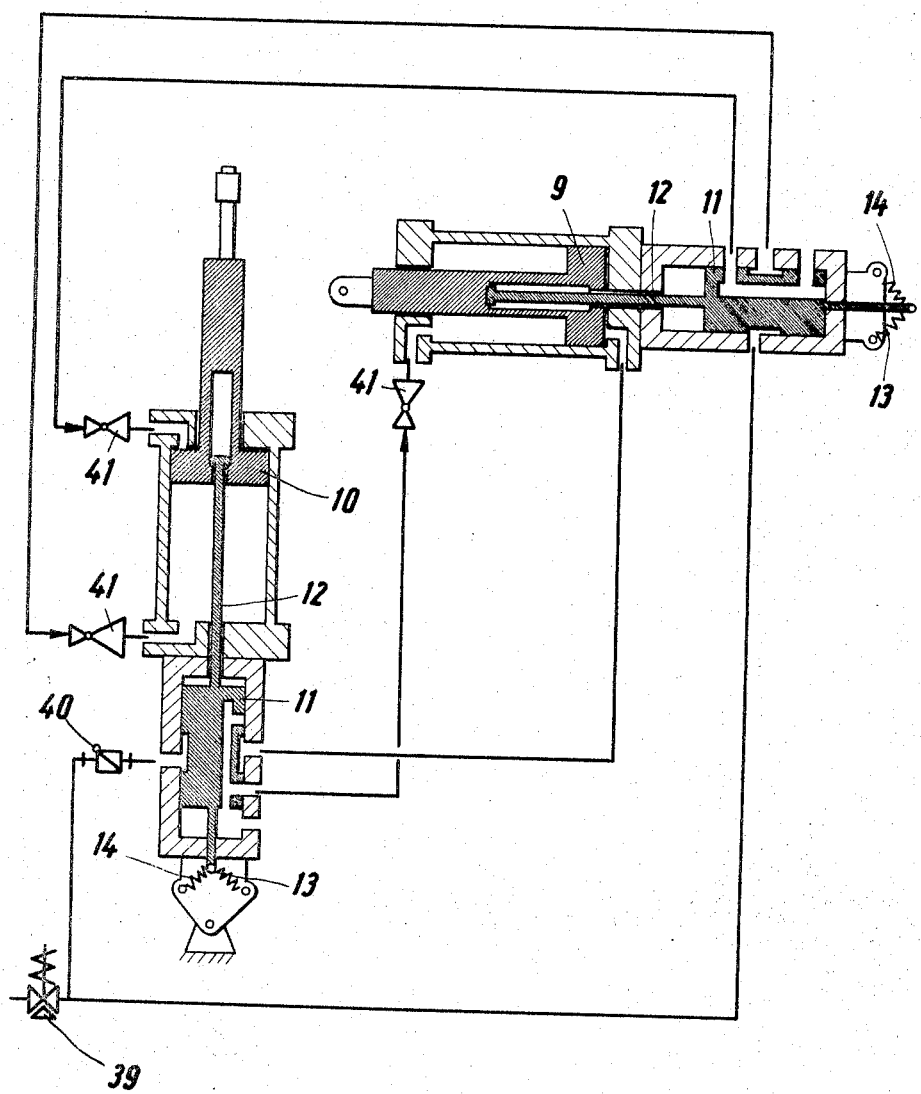
FIG. 2 is a schematic diagram of the pneumatic cylinders which actuate the fork of the apparatus of this invention.
Figure 3:
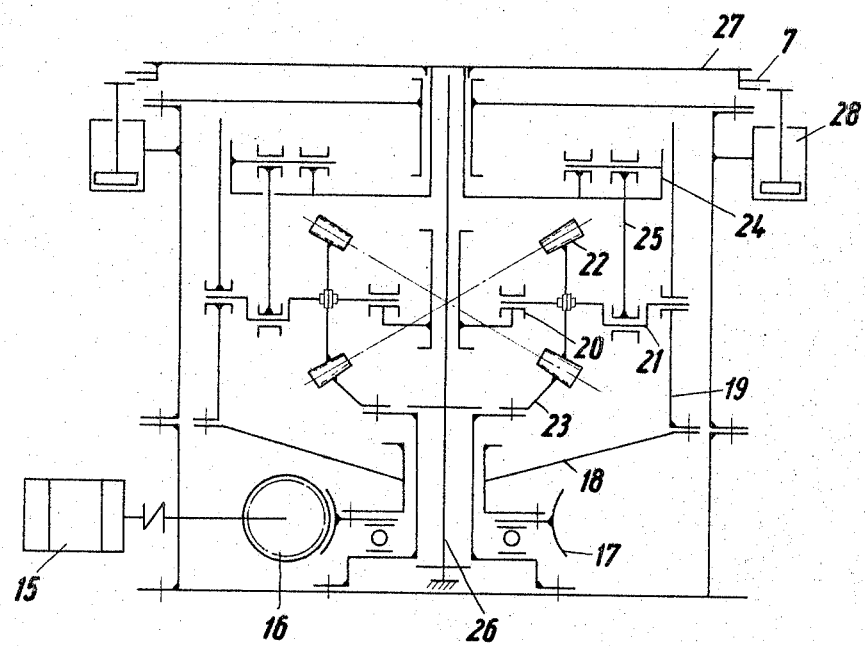
FIG. 3 is a schematic diagram of the drum filling means also illustrating schematically the centrifugal movement means and jolting movement means.

Referring now to the drawing there is illustrated the automatic apparatus of this invention for packing of carbide pellets in drums which comprises a drum displacing device formed by a fork 1, which is driven, for its translation movement, by a pneumatic cylinder 2, and for its lifting and lowering movement by another pneumatic cylinder 3. The aforementioned two cylinders operate in perpendicular directions with respect to each other. A stop dog mechanism 4 is actuated by a roller chain 5 which is driven by the pneumatic cylinder 3 of the drum filling means. The latter is provided at its top with an inner-castelled wheel 7 and an automatic drum clamping device 4 which holds the drums during the filling up operation.

The pneumatic cylinders 2 and 3 are of similar design, and respectively actuate the fork 1 by means of the piston 9 for the translational movement of the fork 1 and by means of the piston 10 for the rotational movement (lifting or lowering) of the fork 1. Before reaching the respective ends of their strokes, pistons 9 and 10 respectively, drive each—by means of a rod 12—a distributing slide valve 11, which are secured at their end positions to their respective valve housings by means of levers 13 which are provided with springs 14.

Figure 4:
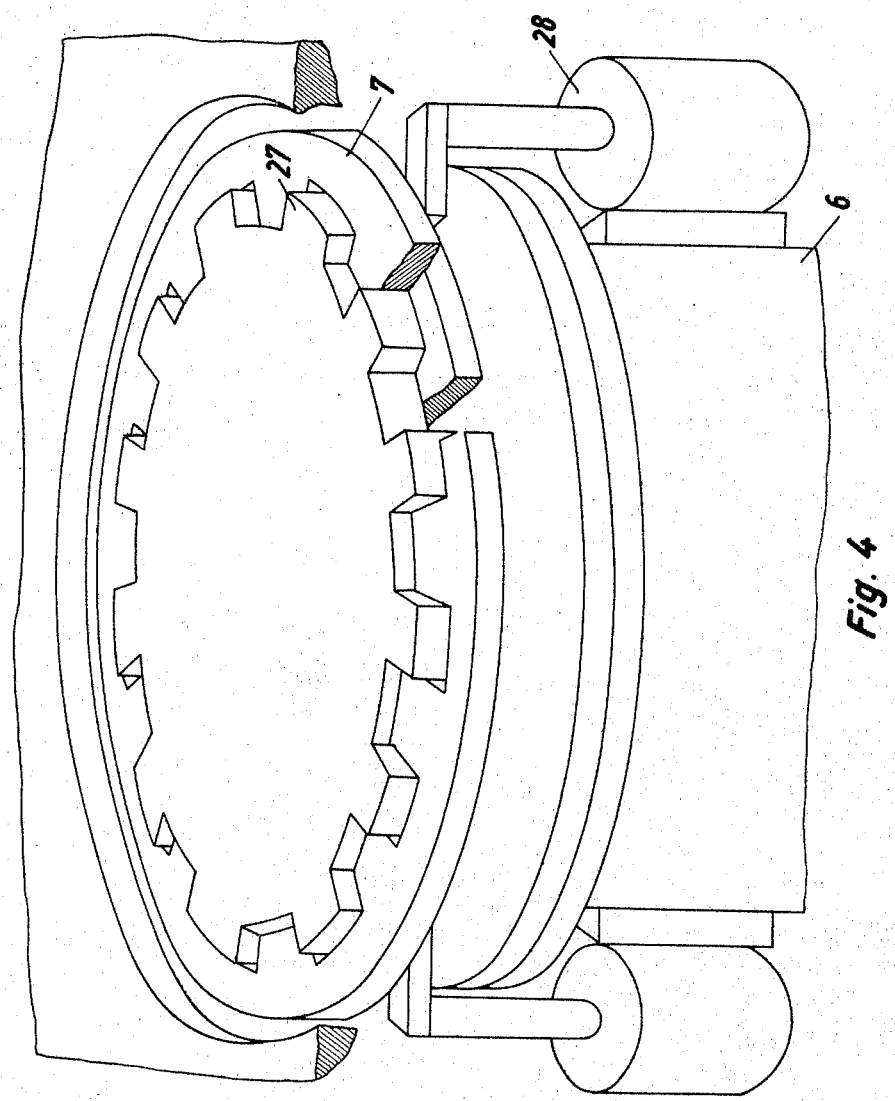
FIG. 4 is a perspective view of the setting and centering means for the drums in the apparatus of this invention.
Figure 5:
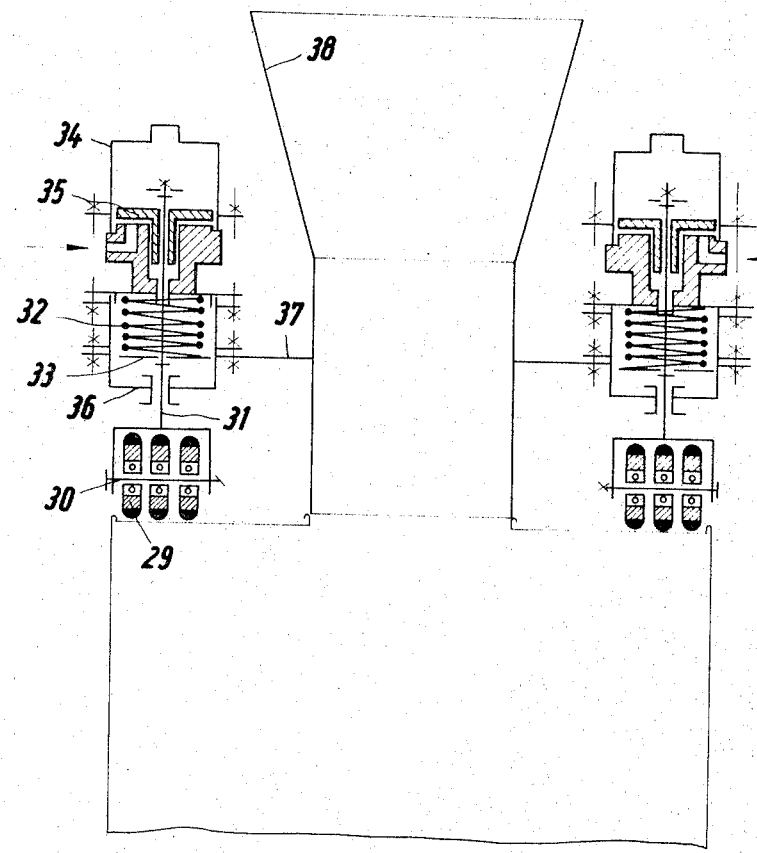
FIG. 5 is a schematic diagram of the device for securing and holding the drums on the drum filling means of the apparatus of this invention.
Figure 6:
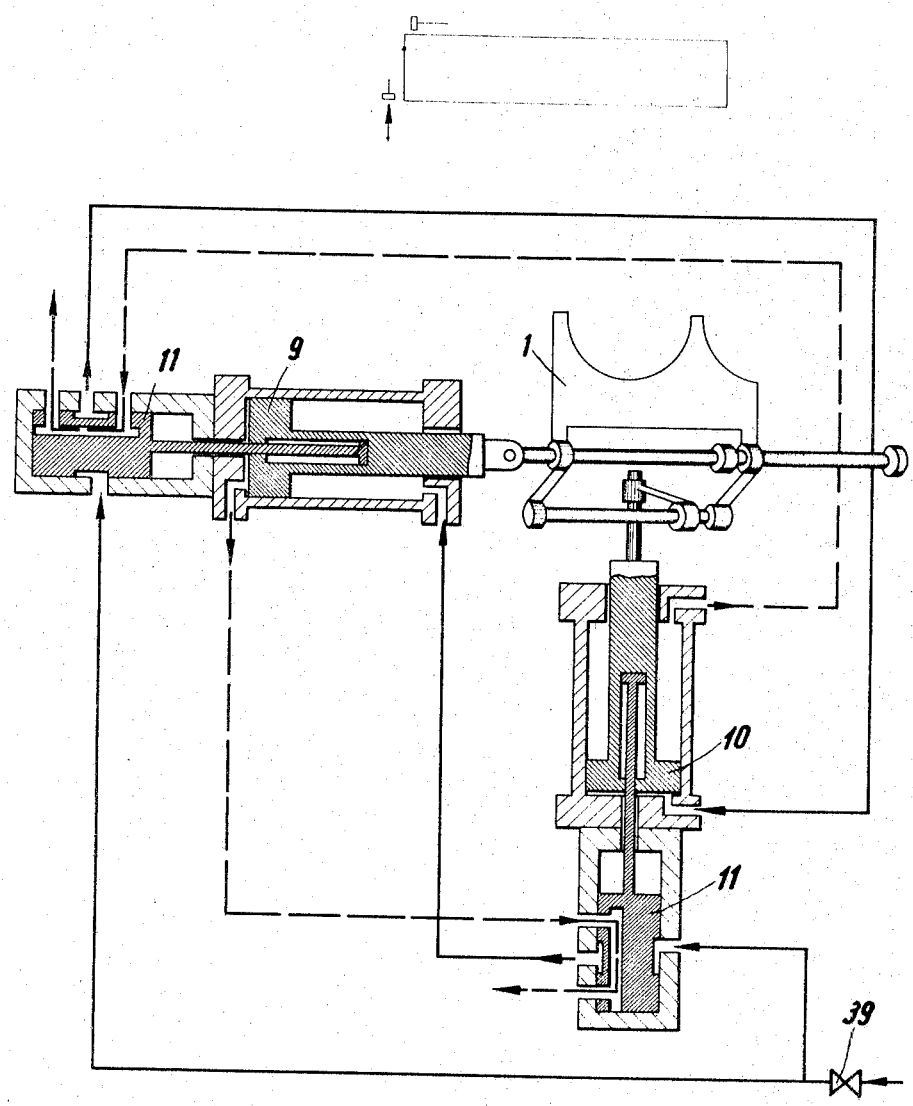
FIGS. 6, 7, 8 and 9 illustrate schematically four operative stages of the hydraulic actuating means for the fork (travelling cycle).
Figure 7:
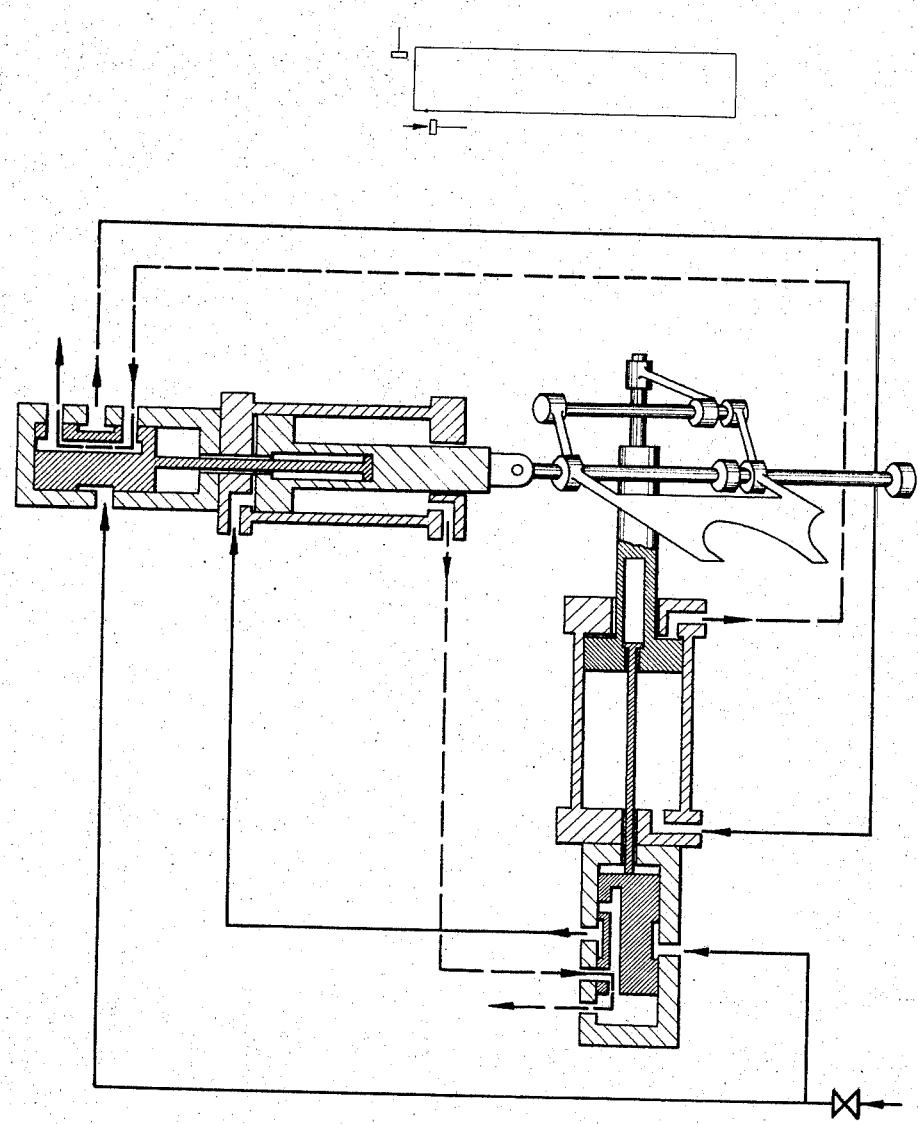
Figure 8:
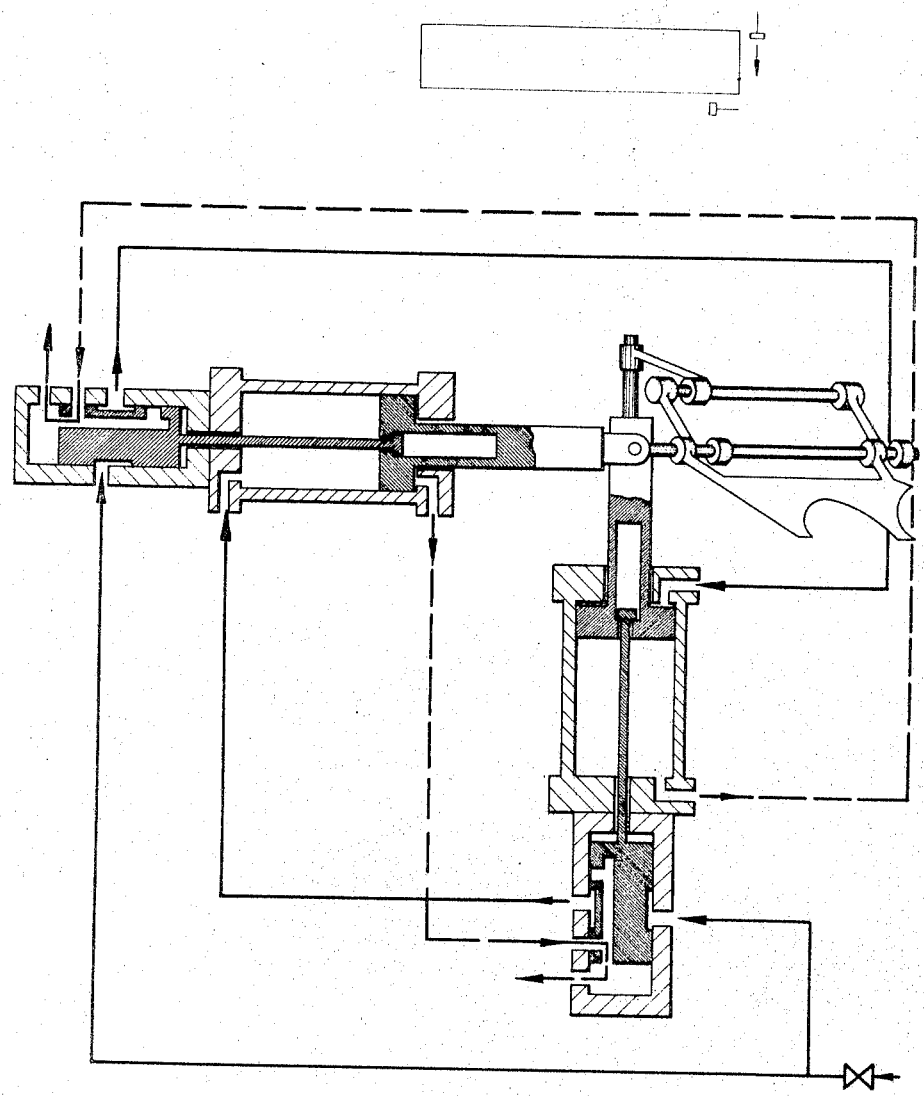
Figure 9:
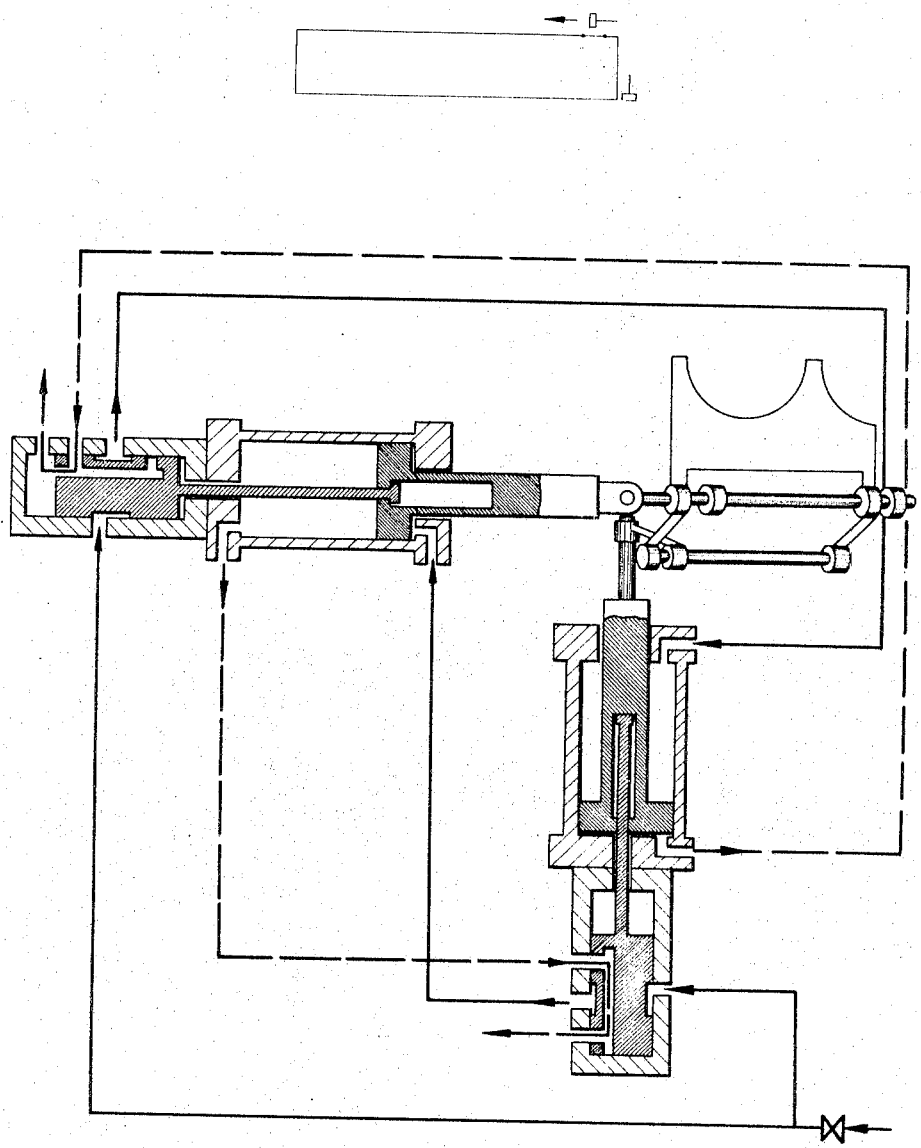

The drum filling means comprises an electric motor 15 which drives a worm gear 16 and a rotatably mounted worm wheel 17. On the latter a disc 18 is rigidly secured, which supports a cylinder 19. The cylinder 19 drives, by means of its incorporated bearings 20, about the vertical shaft 26 of the machine, the crankshafts 21, which in turn, rotate the conical satellite gears 22. The latter gears run on the fixed planetary crown 23 and determine the rotation around the horizontal axis of the crankshafts 21, which in turn drive the pan 24, in an up-and-down movement, by means of the connecting rods 25. The up-and-down movement of the pan 24 and the rotational movement of cylinder 19 about the shaft 26 are transmitted to the externally castellated dish 27, on which there is centrally placed, the drum during its filling operation. As illustrated in FIG. 4 the inner-castellated wheel 7 and the externally castellated dish 27 mesh with each other.

The centering of the empty drum and the protection of the drum bottom against damage during the filling operation is provided for by the inner castellated crown 7, the lifting movement of which is actuated by the pneumatic cylinders 28.

The drum clamping device which is mounted on the drum filling apparatus consists of a number of rollers 29, mounted on the shaft 30, and pressed against the drum cover by means of a rod 31, having a co-axial spring 32 mounted thereon, which rests on a dish 33. The lifting of the rollers 29 is accomplished by means of the pneumatic devices 34 which include the pistons 35 axially mounted therein which are driving, in their upward movement, the shafts 31. The whole drum clamping device comprises three or more pneumatic devices 34 having corresponding groups of rollers 29 and is connected to the carbide pellet feeding hopper 38 by means of the connecting pieces 36 which are mounted on the disc 37.

The automatic drum filling apparatus of this invention operates as follows:

The automatic unit for packing of carbide pellets in drums receives the empty drums from a driven roller conveyor which is mounted in the plant and delivers the drums after filling to the same conveyor. The drum-filling means is installed in such a way over this conveyor that the roller-support forms a continuous structure defining a path leading to and from the drum filling means.

The drums are placed on the conveyor and are being laterally guided by two longitudinally extending bars incorporated in the conveyor-structure. The guide bars lead the empty drums to the filling station of the device. The lateral gaps between the guide bars and the drums diminish as the latter approach the filling station and then the lateral gap distances increase again to the initial gap distances after the filled drums have reached again the straight portion of the roller conveyor.

The empty drum, when clamped on the filling station of the device, receives the carbide pellets from an oscillating feeder, which is mounted over the feeding station, and in the hopper of which is discharged the material weighed by an automatic scale, also incorporated in the unit.

The sequence of operations of the automatic drum filling apparatus of this invention is as follows:

The automatic scale, on discharging its load, actuates also the starting switch for the electrical motor 15 of the automatic drum filling means 6; after the drum has been filled, a timing relay (not illustrated) stops the electrical motor 15 and opens a compressed air network through an electromagnetic valve 39; the distributor-piston 11 mounted in the pneumatic cylinder 2, before shifting the compressed air distribution to the cylinder 3 at the beginning of the return stroke thereof, and at the end of a to and fro cycle, causes the closing of the electromagnetic valve 39 which shuts off the compressed air feeding and opens the air supply network from the electromagnetic valve 39 to both pneumatic cylinders and thence to the atmosphere; in front of a piston 9, compressed air is retained by the check valve 40 and is conducted thereto via the slide valve 11 of the pneumatic cylinder 3.

The compressed air network is feeding the pneumatic cylinders as follows:

Compressed air is supplied to the opposing pneumatic cylinders 2 and 3, the pistons of which actuate the fork 1; to the pneumatic cylinders 28 which are incorporated in the drum filling means 6 and which control the lifting of the inner castellated wheel 7; to the pneumatic cylinders 34 which form part of the drum clamping device 8 which is mounted over the drum filling means 6 and serves to lift up the roller groups 29, thus permitting the transfer of the filled drum from the filling station to the roller conveyor.

The fittings of the compressed air supply network, in addition to the standard inlet connections for the pneumatic cylinders and for the distributor slide valves, such as the standard T, nipple- and elbow-pieces, include the following:

A three-way electromagnetic valve 39 which opens the compressed air network under control of a timing relay (not illustrated) and shuts it off by means of the action of piston 9, while the latter has reached the end of its backward travel, putting simultaneously the supply ducts of the distributor valves in communication with the atmosphere;

A check valve 40, mounted in the supply duct for the distributor slide valve 11, which is associated with the pneumatic cylinder 3, said slide valve 11 controls the distribution to the pneumatic cylinder 2 and thereby serves to retain the compressed air on the piston face 9;

Three reduction valves 41, one of which is mounted on the pneumatic cylinder 2 in the duct that feeds the space in the cylinder in front of the piston face of the piston 9, and the two others are mounted in the ducts leading into the pneumatic cylinder 3.

In the carbide pellets filling station there is incorporated an automatic scale (not illustrated) which automatically feeds each drum moved to the filling station with the prescribed weight of carbide pellets; thus the scale discharges its load into a hopper after reaching the prescribed weight. The hopper is mounted above an oscillating motor-driven feeder, also forming part of the filling station, and which in turn, feeds the drums with rated weights.

While the automatic scale releases its charge into the feeder hopper, the drum filling means 6 is put in motion. At the same time, the drum is clamped onto the wheel 7 and dish 27 by means of the drum clamping device 8.

The drum filling means produces a continuous revolving and jolting movement of the drum during the filling operation.

The revolving movement disperses the carbide pellets towards the periphery of the drum, destroying the natural falling slope, while the jolting movement rams down the pellets thereby reducing the space occupied by the pellets. Inside the drum, the surface of the heap of pellets is higher at the periphery of the heap than in the center, thus the formed heap tends to build up a parabolic surface, just as liquids do in revolving vessels. Thus, there is realized an efficient filling of the drum, as the pellets are more densely compacted and, consequently, fill up the useful space more efficiently.

The drum, while being revolved and jolted, is clamped by means of the clamping device 8, which is provided with roller groups 29. The roller groups 29 rotate on the drum cover and follow the jolting movement of the latter with the help of the springs 32.

After the filling of the drum with carbide pellets has been completed, a timing relay (not illustrated) stops the operation of the drum filling means and effects the opening of the compressed air network by means of the electromagnetic valve 39.

Compressed air enters now and acts on the pistons respectively mounted in the pneumatic cylinders 28 and 34, as well as on the distributor slide valves 11 of the cylinders 2 and 3. The pistons of the pneumatic cylinders 28 lift the inner castellated crown 7, together with the filled drum, until the drum sustaining rim reaches the necessary level so that the drum may be shifted to the roller conveyor, without regard to the height at which, at random, the plate 27 might stop. The pistons of the pneumatic cylinders 34 lift the rollers 29 of the drum fixture, thereby freeing the drum, so that it may be caught by the fork 1. At the same time, the compressed air, passing through the distributor slide-valve 11, locks the piston 9 in position for the shifting of the fork and lifts the piston 10, which lowers the fork 1.

The movements of the drum, as well as of the fork 1 are represented in diagrams of FIGS. 6, 7, 8, 9, and take place in the following sequence:

Piston 10 raises up and rotates the fork (lowers it), while piston 9 remains locked at left;

Piston 9 shifts the fork to the right, the piston 10 remaining locked in the top position;

Piston 10 descends and rotates the fork (raising it), while piston 9 remains locked in the lower position;

Piston 9 shifts the fork to the left, while piston 10 remains locked in the lower position.

The various phases of opposite actions by the pneumatic cylinders 2 and 3, illustrated in FIGS. 6 to 9, are preceded by a diagrammatic representation, in the form of a rectangle, the two horizontal sides of which represent the strokes of piston 9, while the two vertical sides represent the strokes of piston 10. The points on the rectangle represent the loci of the respective movements of the pistons 9 and 10, which are very near to the extreme positions of the strokes. Contiguous to the sides of the rectangle the positions of the pistons 9 and 10 are diagrammatically represented in their respective positions. The pistons, which are moving in the various phases, are marked by an arrow, which indicates also the direction of their respective movements.

The represented phases compose a working cycle, which consists of the steps of catching the empty drum between the fork 1 claws, after the drum has been brought along by the roller conveyor, and the lifting of the filled drum from the filling means, the shifting of the filled drum from the filling means, the releasing of the drum from the fork claws 1, so that the filled drum be taken by the roller conveyor and transferred by the latter to a storage area, while a new empty drum is clamped on the drum filling means, and the bringing back of the fork to the initial position for the next working cycle.

The above described working cycle is performed by the opposing action of the pistons of the cylinders 2 and 3, that is to say, each piston controls the shifting of the other, only after having reached the end of its stroke. For this purpose, each distributor sliding valve 11 is separately connected to the compressed air network and the air distribution to the cylinders is "cross"-connected, namely, each distribution device is connected for feeding and discharging of air with the other pneumatic cylinder, and not with that one with which it is mounted and mechanically driven.

For convenience, the side of the pistons facing towards the distributor slide valves is called "piston rear" and the port of the pistons facing towards the fork is called "piston front."

Piston 10 in its upward movement for lowering the fork, which shifts the drums, catches at the end of the stroke the distributor slide valve 11 by means of the rod 12, thus changing the position of the distributor valve 11, and thereby shifting also the air distribution to the pneumatic cylinder 2. The compressed air acting at the rear part of piston 9 now shifts the fork 1 with the two drums.

Piston 9, towards the end of the stroke, changes the position of the distributor slide valve 11 via the rod 12 which causes the compressed air to act on the front of the piston 10, thereby forcing the fork to rise and to release the drums. At the same time the piston 10 which, when arriving at the end of its stroke, changes the position of the distributor slide valve 11, which causes, in turn, a shift of the compressed air flow onto the piston front 9, thereby causing the raised fork 1 to return to its initial position.

During the return stroke of piston 9, namely at the moment when the piston 9 pushes the slide valve 11 for shifting the air flow in the pneumatic cylinder 3, the compressed air network becomes locked by means of a three-way electromagnetic valve (not illustrated), which at the same time opens to the atmosphere the compressed air network between itself and the pneumatic cylinders. Piston 9 remains locked by the compressed air that is retained in the cylinder housing through the valve 40 which insures the fixed position of that piston.

The movement of the fork 1 controls the action of the stop dog 4 by means of the roller chain 5, so that, while the fork 1 is lowered (rotating) it catches between its claws the filled and the empty drums, while the stopdog 4, which has locked in position during this time, holds the empty drum that must be shifted onto the filling station and holds similarly all other empty drums brought to the filling station by the roller conveyor, and then raises and operatively releases the empty drums. Thus, a subsequent drum can be shifted forward, being pushed by the roller conveyor, while fork 1 leads the filled up drum onto the conveyor and the empty drum on the filling station.

The present invention offers the following advantages:

It ensures the filling of drums with a minimum of voids, by charging the drums with carbide pellets or other materials, applying a centrifugal motion—combined with a jolting-motion, thus providing for reduced packaging sizes, which results in a better utilization of the sheet metal for the manufacture of the drums;

It increases the plant productivity;

It eases the working conditions and ameliorates the plant atmosphere caused by dust and noise which are eliminated to a great extent;

It is more compact than other similar packing units;

It operates automatically and thus substantially dispenses with human labor;

It avoids the danger of the drum being damaged during the filling operation;

It offers the possibility for complete automation of sortage and packing plants for similar materials.

What we claim is:

1. An automatic drum filling apparatus for sequentially filling a plurality of empty drums with pellets having a diameter in the range of 4 mm. to 80 mm., comprising in combination, drum filling means, conveyor means operatively connected to said drum filling means for transporting empty drums to said conveyor means and filled drums away from said conveyor means, said drum filling means comprising combination jolting and revolving means for rotating and jolting a filled drum while the latter is being supported by said drum filling means, clamping means operatively mounted in said apparatus for maintaining said filled drum in position in said drum filling means during said rotating and jolting thereof, and means operatively mounted in said drum filling means for lifting an empty drum from one side of said conveyor means and transporting it into said drum filling means and lifting said drum after it has been filled by said drum filling means and transporting it to the other side of said conveyor means.

2. The automatic drum filling apparatus for filling sequentially a plurality of empty drums with pellets as set forth in claim 1, wherein said drum filling means comprise a base, a cylinder axially rotatably mounted in said base, electric motor means operatively connected to said cylinder for rotating it, crankshaft means supported by said cylinder and being frictionally rotated by the latter about an axis substantially perpendicular to the axis of said cylinder, a platform supported by said crankshaft means and being reciprocated in a direction parallel to said axis of said cylinder, said platform supporting a drum during the filling operation thereof.

3. The automatic drum filling apparatus for sequentially filling a plurality of empty drums with pellets as set forth in claim 2, wherein said means that are operatively mounted in said drum filling means for lifting an empty drum, comprise fork means pivotally and slidably mounted over said platform, said fork means being adapted to place an empty drum of said plurality of empty drums on said platform and remove it therefrom after the filling operation thereof has been completed, first pneumatic cylinder means connected to said fork means for slidably reciprocating said fork means, second pneumatic cylinder means connected to said fork means for pivotally reciprocating said fork means, a compressed air source, first and second slide valve means respectively operatively connected to said first and second pneumatic cylinder means and being pneumatically connected to said compressed air source, said first and second slide valve means being adapted to respectively sequentially place opposite ends of said second and first pneumatic cylinder means into communication with said compressed air source thereby causing said fork means to move in the following operative cycle:
 (a) said first pneumatic cylinder means being locked in position while said second pneumatic cylinder means pivots said fork means downwardly;
 (b) said second pneumatic cylinder means being locked in position while said first pneumatic cylinder means slidably moves said fork means to the right;
 (c) said first pneumatic cylinder means being locked in position while said second pneumatic cylinder means pivots said fork means upwardly;
 (d) said second pneumatic cylinder means being locked in position while said first pneumatic cylinder means slidably moves said fork means to the left.

4. The automatic drum filling apparatus for sequentially filling a plurality of empty drums with pellets as set forth in claim 3, wherein said clamping means comprise biasing means adapted to press against the top of a drum during the filling operation thereof, thereby maintaining said drum in position on said platform, and pneumatic lifting means operatively connected to said biasing means for selectively lifting said biasing means from the top of a filled drum after the filling operation and lowering said biasing means again onto the top of an empty drum after the latter has been placed on said platform by said fork means.

References Cited

UNITED STATES PATENTS

| 2,499,310 | 2/1950 | Hathaway et al. | 141—73 X |
| 3,043,350 | 7/1962 | Stone | 141—73 |
| 3,192,965 | 7/1965 | Smith | 141—73 |

FOREIGN PATENTS 160,972  4/1921  Great Britain.

LAVERNE D. GEIGER, *Primary Examiner.*

H. BELL, *Assistant Examiner.*